UNITED STATES PATENT OFFICE.

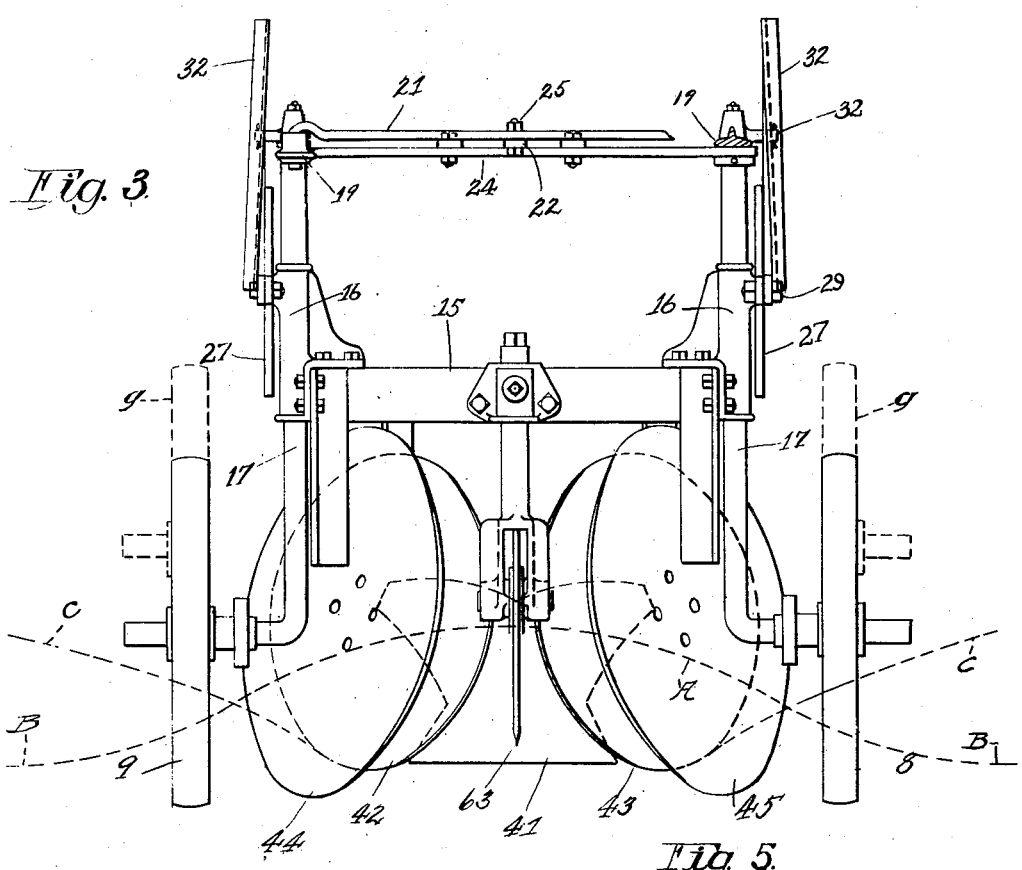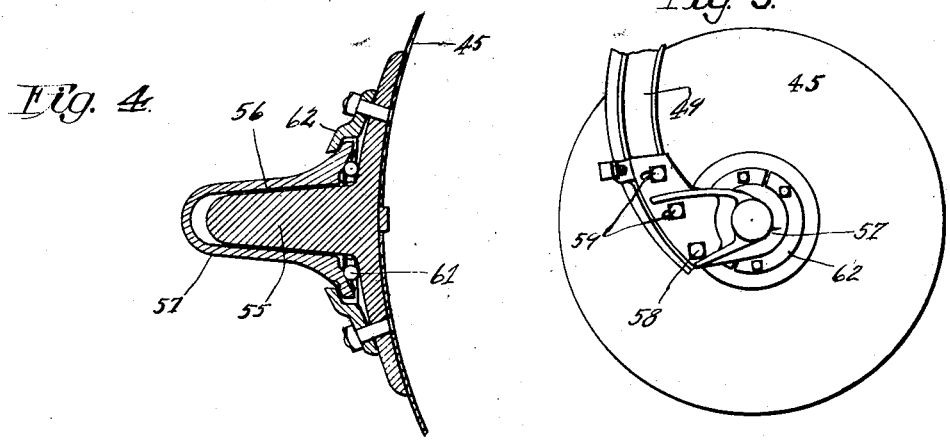

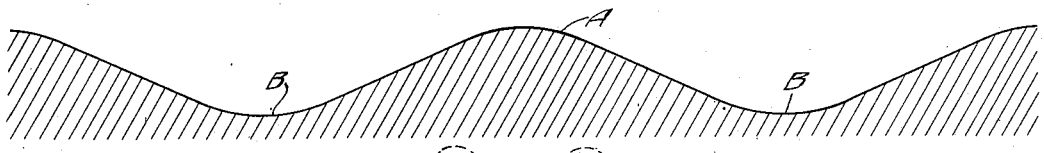
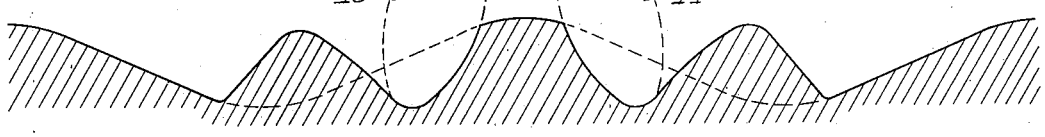
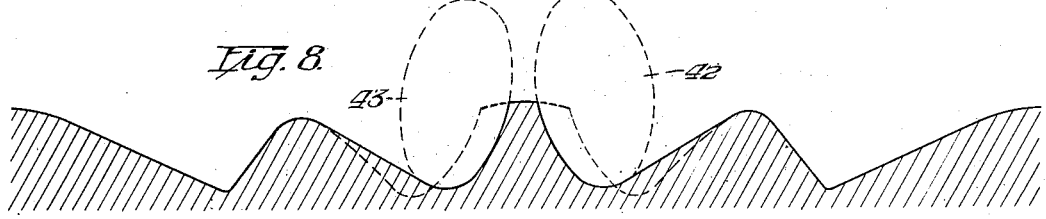
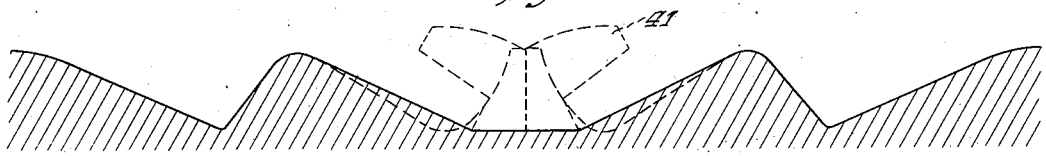
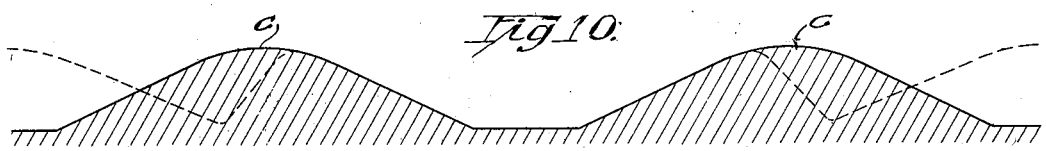

BYRON C. THOMSON, OF NEW ORLEANS, LOUISIANA, ASSIGNOR TO EMERSON-BRANT-INGHAM COMPANY, OF ROCKFORD, ILLINOIS, A CORPORATION OF ILLINOIS.

RIDGING PLOW.

1,421,109.  Specification of Letters Patent.  Patented June 27, 1922.

Application filed November 15, 1919. Serial No. 338,146.

*To all whom it may concern:*

Be it known that I, BYRON C. THOMSON, a citizen of the United States, residing at New Orleans, in the parish of Orleans and State of Louisiana, have invented certain new and useful Improvements in Ridging Plows, of which the following is a specification.

This invention pertains to plows adapted for ridging a field, and has more particular reference to what is known as a "sugar land plow", because of its peculiar adaptation to the conditions and requirements in preparing cane land for seed, especially where the question of drainage is an important factor. My invention, however, is of a broader scope, in that it pertains to the ridging of any field, whether in an arid section or dry, or for irrigation purposes.

The desideratum of my improvements will be readily appreciated by an illustration of the conditions and requirements for preparing a cane field of the character in mind. The cane is planted in the crest of the ridges, the average height of which is from 12 to 14 inches and the distance between ridges about six feet, that is, from center to center of water furrows. The reason for planting in the crest of the ridges is for purpose of drainage. In arid sections of the country (as will be explained hereinafter) other products, such as corn, are planted in the furrow instead of in the crest. After the cane is laid by or harvested the ridges are destroyed or reversed for the new planting, or in other words, the land is worked or turned so that each new ridge occupies the space of a former furrow. The planting, however, is not until three or four months after the harvest, and during this time the soil packs very fast and becomes quite hard and compact. Furthermore, the furrows and ridges are filled with strips from the cane and with vines. In many instances, there is considerable vegetable growth so that the matter of destroying the old ridges, turning under the trash and constructing new ridges, especially of the dimensions in mind, presents many difficulties. Heretofore, the work has been done by a series of plowing operations, requiring for turning each ridge, the services of from six to eight men and twelve to fourteen mules. At least four plowing operations are necessary to destroy a single ridge. It is evident that this work requires considerable time and labor.

The primary object of the present invention is to provide a plow which will, in a single operation, destroy or turn a ridge of the character just described, in a most satisfactory and effectual manner. That is, the dirt in the old rows is turned into what was formerly the water furrows, so that when the ridging is completed, the plow has not only moved the old ridges, but has thrown up new ones for the purposes desired. My improvements, therefore, effect a great saving in time, labor, and expense, and are highly desirable for the ridging of cane and other fields.

Another important object of my invention resides in the provision of a ridging plow of the character mentioned, constructed in such novel manner as to be thoroughly practical under any and all conditions for which it is adapted, and which shall be capable of production as a commercial article at a comparatively low cost, considering the functions performed.

In furtherance of the foregoing, my invention contemplates as an object the provision of a plow characterized by a middle breaker plow, a pair of disks mounted forward of the middle breaker for turning the land to the opposite sides thereof, and a second pair of disks mounted forward of the first and at the outer side thereof, said disks and middle breaker being arranged in such novel relative relation as to function in an especially advantageous manner, as will be fully described hereinafter.

Other objects and attendant advantages regarding special features of the plow will be readily appreciated as the invention becomes better understood by reference to the following description when considered in connection with the accompanying drawings, in which—

Figure 1 is a plan view of a ridging plow embodying my improvements;

Fig. 2, a side elevation of the plow;

Fig. 3, a front elevation;

Fig. 4, a sectional view taken substantially on the line 4—4 of Fig. 1;

Fig. 5, a view illustrating the mounting of one of the disks;

Fig. 6 is a diagrammatic view showing the surface contour of a ridged cane field before reridging;

Figs. 7, 8 and 9 are diagrammatic views respectively illustrating the successive plowing operations which are performed in one operation by my new plow; and Fig. 10 is a diagrammatic view showing the finished work.

Figure 1:
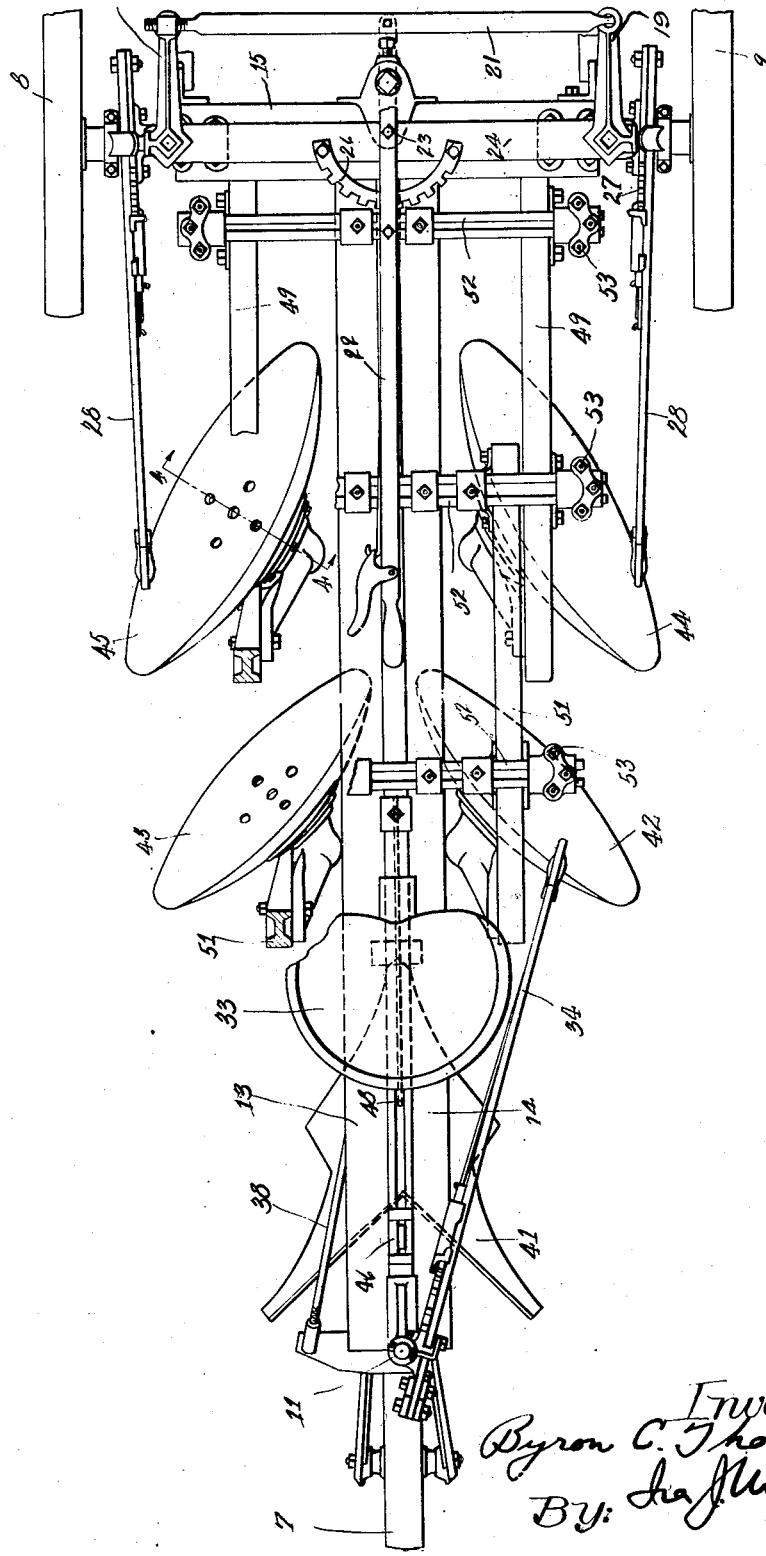
Figure 2:
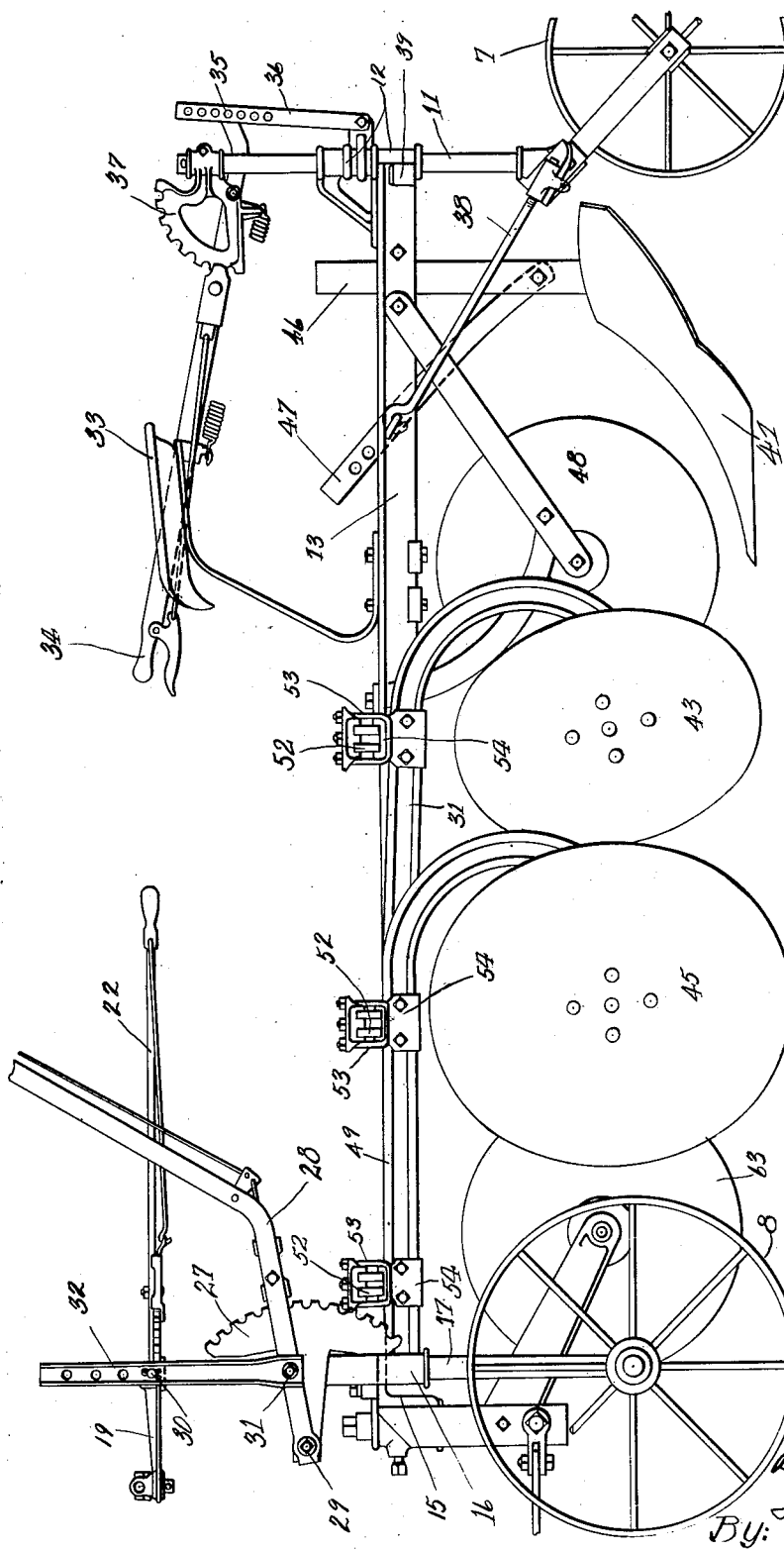

It should be borne in mind that the present application simply illustrates a single practical embodiment of my invention which latter contemplates broadly the novel combination of parts hereinafter described for the purpose of accomplishing the objects above mentioned, irrespective of details of construction unless such are specifically claimed. The frame and plow bodies are supported and carried by a rear furrow wheel 7 and a pair of front dirigible wheels 8 and 9. The rear furrow wheel is connected to the spindle 11, slidable vertically in bearing brackets 12 which are rigidly secured to a pair of frame bars 13 and 14 extending longitudinally centrally of the plow from end to end thereof. These frame bars or sills in the present instance in the form of angle iron bars constituting a central frame structure, are rigidly united at their forward ends to a cross bar 15. To each outer end of the cross bar structure 15 is rigidly secured a bearing bracket 16 in which is vertically slidable and rotatable about the longitudinal axis, a wheel spindle or standard 17 upon the lower out-turned end of which is revolubly mounted a front carrying wheel. Upon each upper end of the spindle is secured a forwardly extending arm 19, the forward ends of which are joined by a tie rod 21 for holding the front wheels in parallelism. A hand lever 22 pivotally mounted at 23 on a cross bar 24 joining and mounted at its end on the standards 17, is connected at its forward end to the tie rod 21 at the point 25 and equipped with the usual latch engagement with a notched segment 26 on the bar 24, for angling the steering wheels 8 and 9 and for holding the wheels in any set position with respect to the plow frame. Each front wheel spindle 17 may be independently vertically adjusted upon and with respect to the frame and held in such adjusted position for levelling the frame or for holding it in position with one side higher than the other, as occasion might require under different conditions. For this purpose, there is mounted on each bracket 16 a notched segment 27 with which co-operates a hand lever 28 pivotally mounted at 29 on a part fixed with respect to the bracket 16 and connected at 31 to an upstanding part 32 connected to an outstanding lug 30 integral with the socket portion of the adjacent spindle arm 19. By swinging either lever 28 vertically its respective front wheel will be correspondingly adjusted with respect to the plow frame. The levers 22 and 28 extend rearwardly into convenient reach of the operator who is seated at 33 just in front of the rear furrow wheel. The furrow wheel is also vertically adjustable with respect to the main frame from the operator's seat by manipulation of a lever 34 pivotally mounted at 35 on a part 36 connected with the main frame, said lever co-operating in the usual manner with a notched segment 37 attached to the upper end of the spindle 11. During operation, the rear furrow wheel 7 is free to caster, but when transporting the plow it is held against such movement by a tie rod 38 shown in transportation position in Figs. 1 and 2. It will be obvious that the lower end of the rod 38 may be quickly disconnected by the removal of a cotter pin, allowing the rod to be raised to an inoperative position and held therein by a hooked cleat 39. From the foregoing, it will be apparent that I have provided a frame carried by front dirigible wheels and a central rear furrow wheel, and means for adjusting each wheel vertically with respect to the frame so that the frame may be raised and lowered throughout its length and set at any working angle or level desired.

Coming now to the arrangement of plow bodies, it will be presently apparent that I have provided a novel combination of disk plows and a middle breaker plow, peculiarly and advantageously adapted for the conditions mentioned above with reference to the ridging of cane fields. It should be borne in mind that these ridges are of comparatively large dimensions and to destroy or transform them in a single operation requires the handling and turning of a considerable quantity of soil. Furthermore, it is imperative that this shall be done without imposing too great draft, because it is desired to draw an implement of this kind with a small tractor. The plow bodies comprise, generally stated, a middle breaker plow 41 positioned centrally beneath the frame just in front of the rear furrow wheel, a pair of disks 42 and 43 in front of said middle breaker plow and a second pair of disks 44 and 45 forward of the first disks. The middle breaker plow is supported rigidly but vertically adjustable on the main frame by means of a standard 46 and a brace bar 47 bolted between the longitudinal frame bars 13 and 14. Immediately in front of the middle breaker plow is supported a colter 48 of relatively large diameter. This colter while being freely rotatable is supported in fixed relation to the main frame so as to perform not only its usual functions as a colter but also to serve as a rudder to hold the plow centrally on the ridge as will be explained more fully hereinafter. Each disk is mounted on an independent plow beam, in turn adjustably supported on the main frame. The plow beams 49 and 51 for the front and rear disks respectively, are carried by transverse saddle bars or beams spacing bars 52. These bars, rigidly secured to the central frame bars 13 and 14, are equipped at their outer ends with U-bolts 53 which embrace the underside of the laterally projecting saddle brackets 54, in turn bolted to the plow beams. It will be observed that there are three pairs of saddle bars 52, the foremost for supporting the forward ends of the front beams 49, the middle pair for supporting both the rear and forward ends respectively, of the beams 49 and 51 and the rearmost pair for supporting the rear ends of the beams 51. This construction permits individual lateral adjustment of the plow beams, upon and with respect to the saddle bars 52 for the purpose of widening and narrowing the furrow cut by the plow. The disk mountings are identical in construction, consequently but a single illustration is given, viz: that of one of the forward disks 45. Each disk bearing bracket is secured to the inner side of its respective beam, the construction being shown in detail in Figs. 4 and 5. It should be understood, however, that the invention is in no way limited to the particular form of bearing herein illustrated. The disk 45 is rigidly secured to a spindle bracket 55 having a tapered bearing 56 in a bracket 57 which is secured to the beam 49 by means of bolts 58 and 59. An end thrust bearing 61 is interposed between the parts 55 and 57 and a retaining ring 62 holds these parts in associated relation. The bracket 57 is adjustable forwardly and rearwardly about the bolt 58 as a pivot and for this purpose the holes in the bracket 57 through which the bolts 59 pass are slotted as shown plainly in Fig. 5. This adjustment enables setting of the disks to obtain more or less suction and to change the angle of delivery, such adjustment being made to suit the particular soil conditions at hand and without changing the general plan and arrangement of the disks, which will now be described.

It will be observed that the rear disks are set relatively close together so as to form a furrow at each side of the center and substantially to the same depth of and contiguous with that formed by the middle breaker plow. The forward disks, of greater diameter than the rear disks, are set outwardly therefrom and cut deeper, as plainly illustrated in Fig. 3. In front of the forward disks and centrally therebetween, a colter 63 is supported in a conventional manner.

In the operation of destroying or transforming ridges as distinguished from ridging a level field, the plow straddles a ridge as shown in Fig. 3, with the front wheels in the dotted line position about eight inches above the bottom of the front disks. The ridge to be turned is indicated by the heavy dotted line A, the water furrows flanking the same by B, and the new ridges by C. With reference to destroying cane ridges, the soil is generally well packed and covered by a heavy vegetable growth, especially long tangled vines, such as wild pea vines, and in the crest of the ridge is a row of heavy cane stubbles. It is desired to turn all of this trash under when destroying the ridge; consequently, the trash must be cut up and broken and the land so turned as not to clog and interfere with the proper functioning of the plow bodies. It will be observed that the disks are so set that the work of turning the sides of the ridge is substantially equally proportioned. That is, the outermost and forward disks 44 working at the outermost and low sides of the ridge cut deeper than the more centrally and rearwardly located disks 42, so as to turn substantially the same amount of land as the rear disks. These relatively large disks function to better advantage than a small disk in cutting the undergrowth and trash. Furthermore, it is desired that these forward disks throw or deliver the soil as far outwardly as possible. It will be apparent, therefore, that in drawing the plow over a ridge A, the front colter 63 splits the vines, stubbles and other trash; that the front disks cut furrows at the outer sides of the ridges and deliver the soil outwardly into the water furrows B, substantially as shown in Fig. 7; that the rear disks cut new land and furrows substantially to the same extent as the forward disks and deliver the soil outwardly so as to cover the soil turned by the forward disks, substantially as shown in Fig. 8; that the rear colter 48 penetrates to greater depth than the front colter and serves as a rudder for holding the plow in proper alignment with the ridge; and that the middle breaker plow cuts a central furrow, delivering the soil to both sides and forming the water furrow for the newly formed ridges which flank such furrow, substantially as shown in Fig. 9. Under the conditions mentioned above, it should be noted that very frequently the stubble is not exactly in the center of the ridge, consequently the resistance to each side of the plow varies considerable. The natural tendency is to follow the line of least resistance, hence special provision must be made for keeping the plow in alignment with the ridge under ordinary working conditions. To this end the large rear colter 48 serves as a rudder to hold the plow in such alignment, and additional means to this end is the use of double pairs of disks in the manner described. In the case of heavy stubble out of center, it would be extremely difficult to turn such stubble with a single pair of disks and moldboard and keep the plow in line, by reason of the fact that one of the disks would encounter considerable resistance while the other, very little. Under the present arrangement the heavy stubble mentioned would be cut up into small portions by the double set of disks, thus more equally dividing the resistance, and with the aid of the rudder colter the plow will follow the ridge during the ordinary variations in resistance. The double pairs of disks so arranged are further desirable in that they more thoroughly pulverize and break up the soil and do not leave it in large chunks as would be the case if a single pair of disks were employed large enough to destroy in combination with a middle breaker plow, a ridge of the character in mind. Attention is further directed to the fact that the rear disks are set at a more abrupt angle than the forward disks. This is for the purpose of securing with a smaller disk than the forward disk, a cut of substantial depth and inwardly from the forward disk and a delivery outwardly to practically the same extent as that of the forward disk, and further to insure rotation at all times.

During the operation, the operator seated on the seat 33 manipulates the steering lever 22 to properly guide the plow and further manipulates the levers 28 if occasion requires, to raise or lower one side or the other of the plow frame to impose greater resistance to the disks at either side for the purpose of keeping the plow in proper alignment with the ridge. Such adjustment, however, is but infrequently required during the operation and on only such occasions as when the resistance to the plow at either side of the center is so unequal that it cannot be properly cared for by the agencies above described for this purpose.

With the use of a plow such as just described for leveling and transforming cane or similar ridges, a considerable saving in time, labor and expense, is effected. This follows from the fact that I destroy an entire ridge in one operation where heretofore it was necessary to go over a single ridge three or four times, in successive plowing operations employing the use of some 12 to 14 mules and 6 to 8 men. And because of the novel and advantageous arrangement of the plow bodies for turning in one operation a comparatively large body of soil, the draft is relatively small and a light tractor may be effectively used as the draft medium.

My improvements are adapted not only for destroying and reforming ridges of the character described, but are also well adapted for forming trenches for irrigation purposes. Also its use in forming ridges is not limited to ridging cane fields and the like to the extent desired for purpose of drainage, but is equally well adapted for ridging fields in arid sections where the practice is to plant the crop in furrows.

It is believed that the foregoing conveys a clear understanding of the principles and objects prefaced above, and while I have illustrated and described but a single working embodiment of my improvement, it should be understood that the same are susceptible of considerable change in construction and arrangement without departing from the spirit and scope of the invention as expressed in the appended claims; in which—

I claim:

1. In a ridging plow of the character described, the combination of a frame supported by front dirigible wheels which straddle a ridge and by a rear furrow wheel which treads in the resultant furrow, and plow bodies carried by the frame intermediate said front and rear wheels comprising a pair of front disks of relatively large diameter, substantially spaced apart, one at each side of the center of the plow and arranged to turn the soil outwardly, a disk at the rear of each front disk, set closer to the center and substantially at the same depth to take new land and turn it outwardly over the soil turned by the front disk, and a middle-breaker plow at the rear of and centrally between the rear disks for taking the remainder of the new land left between the rear disks and turning it to both sides over that turned by the said rear disks, whereby the land turned at each side forms a slope from the furrow formed by the middle-breaker plow to the crest of the adjoining ridge.

2. In a ridging plow of the character described for reducing and transforming a ridge in a single operation, the combination of a frame supported by front dirigible wheels adapted to straddle a ridge and a rear furrow wheel adapted to tread in the resultant furrow, and earth-working means carried by the frame intermediate said supporting wheels comprising a pair of front disks of relatively large diameter, substantially spaced apart, one at each side of the center of the plow and arranged to turn the soil outwardly, a disk at the rear of each front disk, set closer to the center to take new land and at a more abrupt angle with respect to the longitudinal axis of the plow than its front disk so as to distribute the soil evenly over that turned by said front disk, and a middlebreaker plow at the rear of and centrally between the rear disks for turning the remaining land to each side of that turned by the rear disks, thereby completing the slope from the furrow to the crests of the ridges flanking the furrow.

3. A plow adapted to reduce and transform in a single operation a ridge of the character described, comprising a frame adapted to straddle a ridge and supported by front dirigible wheels which tread the sides of the ridge and by a central rear wheel which treads the resultant furrow, and plow bodies carried by the frame between the front and rear wheels comprising a pair of front disks, one at each side of the center for cutting a furrow at the outer side of the ridge and turning the soil into the adjoining furrow, a disk at the rear of each front disk for cutting closer to the center of the ridge and turning the soil over that turned by its front disk, and a middlebreaker plow centrally between and at the rear of the rear disks for breaking the remainder of the ridge and turning it to each side over the soil turned by the rear disks, thereby completing a slope at each side of the resultant furrow reaching to the crest of the adjoining ridge formed in the previous furrow from soil of the original ridge.

4. In a ridging plow of the character described, for reducing and transforming a ridge in a single operation, the combination of a frame supported by front dirigible wheels adapted to straddle a ridge and a rear furrow wheel adapted to tread in the resultant furrow, and earth-working means carried by the frame intermediate said supporting wheels comprising a pair of front disks of relatively large diameter, spaced a substantial distance apart and arranged to turn the soil outwardly, a pair of rear disks of less diameter and set at substantially the same depth and at such distance from the center as to take new land and leave an interposed body of new land, a middlebreaker plow at the rear of and centrally between the rear disks for turning the remaining crest portion of the ridge laterally to each side over the land turned by the rear disks, a front colter in advance of the front disks, and a rear colter between the rear disks and the middlebreaker plow and set deeper than the front colter.

5. A plow adapted to reduce and transform in a single operation a ridge of the character described, comprising a frame adapted to straddle the ridge and supported by front dirigible wheels and a rear furrow wheel, and plow bodies carried by the frame between the front and rear wheels, comprising a pair of front disks of relatively large diameter, one on each side of the center and spaced a substantial distance apart for cutting a furrow at each side of the ridge and turning the soil outwardly into the furrow flanking the ridge, a pair of rear disks of less diameter than the front disks and set to cut closer to the center of the ridge and to substantially the same depth as the front disks so as to turn the soil outwardly and distribute it over that turned by the front disks, and a middlebreaker plow centrally in the rear of said rear disks for turning the remainder of the ridge to both sides over the soil turned by the rear disks and completing the slope at both sides of the resultant furrow.

6. A ridging plow of the character described comprising a frame including a center bar structure extending substantially throughout the length of the machine, a cross bar structure rigidly secured to the front end of said center bar structure, a dirigible wheel supporting each end of the cross bar structure, means for steering said wheels, a rear furrow wheel supporting the rear end of the center bar structure, a middle breaker plow suspended from and supported below the frame in front of the rear furrow wheel, two pairs of disks, one pair in advance of the other, in front of the middle breaker plow for turning the soil out at each side of the center, a plow beam upon which each disk is mounted, a plurality of beam-supporting bars extending transversely of and secured to the center bar structure and spaced apart longitudinally thereof, and means for securing the disk plow beams to said transverse bars.

7. A plow adapted to reduce and transform in a single operation, a ridge of the character described, comprising a frame adapted to straddle the ridge and supported by a pair of front dirigible wheels which tread the sides of the ridge and by a rear wheel which treads in the resultant furrow, and plow bodies carried by the frame between the front and rear wheels, consisting of a pair of front disks of relatively large diameter, one on each side of the center and spaced a substantial distance apart for cutting a furrow at each side of the ridge and turning the soil therefrom outwardly into the furrow flanking the ridge, a pair of disks at the rear of the first mentioned disks of less diameter than the same and positioned closer together to cut closer to the center of the ridge and turn the soil outwardly over that turned by the front disks, a middle breaker plow centrally in the rear of said rear disks, and a colter of substantial diameter in front of the middle breaker plow and serving as a rudder for resisting lateral displacement of the plow from alignment with the ridge.

8. A ridging plow of the character described comprising a front and a rear pair of laterally spaced, outwardly faced disks, the rear disks set closer together than the front disks, a middle-breaker plow centrally at the rear of the rear disks, and means for supporting said plow bodies to centrally follow and reduce a ridge, including front dirigible wheels which straddle the ridge and a rear furrow wheel which treads in the resultant furrow.

9. A ridging plow of the character described comprising a front and a rear pair of laterally spaced, outwardly faced disks, the rear disks set closer together than the front disks, a middle-breaker plow centrally at the rear of the rear disks, means for supporting said plow bodies to centrally follow and reduce a ridge, including front dirigible wheels which straddle the ridge and a rear furrow wheel which treads in the resultant furrow, and means for independently raising and lowering each wheel with respect to the plow bodies and for holding it in such adjusted position.

10. In a ridging plow of the character described, the combination of a pair of front laterally spaced, outwardly faced disks tilted rearwardly and inwardly at the top, a pair of rear laterally spaced, outwardly faced, disks set at a more abrupt angle with respect to the line of draft than said front disks and closer to the center of the plow, a middle-breaker plow at the rear of said rear disks, and means for supporting said plow bodies for centrally following and reducing a ridge.

BYRON C. THOMSON.